(12) United States Patent
Ozaki et al.

(10) Patent No.: US 7,700,182 B2
(45) Date of Patent: Apr. 20, 2010

(54) MICROPOROUS POLYOLEFIN MEMBRANE, ITS PRODUCTION METHOD, AND BATTERY SEPARATOR

(75) Inventors: Hiroyuki Ozaki, Kanagawa-ken (JP); Kotaro Kimishima, Kanagawa-ken (JP); Koichi Kono, Saitama-ken (JP); Patrick Brant, Seabrook, TX (US); Zerong Lin, Kingwood, TX (US); Jeffery Lawrence Brinen, League City, TX (US)

(73) Assignee: Tonen Chemical Corporation, Minato-ku, Tokyo (JP)

( * ) Notice: Subject to any disclaimer, the term of this patent is extended or adjusted under 35 U.S.C. 154(b) by 2 days.

(21) Appl. No.: 11/383,260

(22) Filed: May 15, 2006

(65) Prior Publication Data

US 2007/0264483 A1     Nov. 15, 2007

(51) Int. Cl.
*B32B 3/26*     (2006.01)
*C06B 21/00*    (2006.01)
*B29B 55/00*    (2006.01)
(52) U.S. Cl. ................ 428/304.4; 264/3.3; 264/479
(58) Field of Classification Search .............. 428/304.4; 264/3.3, 479
See application file for complete search history.

(56) References Cited

U.S. PATENT DOCUMENTS

2005/0277702 A1    12/2005    Lee et al.

FOREIGN PATENT DOCUMENTS

| JP | 03-064334 | 3/1991 |
|---|---|---|
| JP | 5-222236 | 8/1993 |
| JP | 06-96753 | 4/1994 |
| JP | 07-268118 | 10/1995 |
| JP | 2002-105235 | 4/2002 |
| JP | 2002-194132 | 7/2002 |
| JP | 2004-196870 | 7/2004 |
| JP | 2004-196871 | 7/2004 |

OTHER PUBLICATIONS

English translation of JP 2004-196870, see IDS filed Jul. 31, 2006 for date and inventor.*
Patent Cooperation Treaty-International Search Report, PCT/JP2007/060320, Jun. 5, 2007.
Patent Cooperation Treaty-International Preliminary Report on Patentability, PCT/JP2007/060320, Nov. 17, 2008.

* cited by examiner

*Primary Examiner*—Victor S Chang

(57) ABSTRACT

A microporous polyolefin membrane comprising a polyethylene resin, and polypropylene having a weight-average molecular weight of $6 \times 10^5$ or more and a heat of fusion of 90 J/g or more (measured by a differential scanning calorimeter), a fraction having a molecular weight of $1.8 \times 10^6$ or more being 10% or more by mass of the polypropylene.

18 Claims, 2 Drawing Sheets

MICROPOROUS POLYOLEFIN MEMBRANE, ITS PRODUCTION METHOD, AND BATTERY SEPARATOR

FIELD OF THE INVENTION

The present invention relates to a microporous polyolefin membrane comprising a polyethylene resin and a sufficient amount of polypropylene and having well-balanced permeability, mechanical properties and meltdown properties, its production method, and a battery separator composed of such microporous polyolefin membrane.

BACKGROUND OF THE INVENTION

Microporous polyolefin membranes are widely used for various applications such as battery separators used for lithium secondary batteries, nickel-hydrogen batteries, nickel-cadmium batteries, polymer batteries, etc., electrolytic capacitor separators, various filters such as reverse osmosis filtration membranes, ultrafiltration membranes, microfiltration membranes, etc., moisture-permeable, waterproof clothes, medical materials, etc. When the microporous polyolefin membrane is used for battery separators, particularly lithium ion battery separators, its performance largely affects the properties, productivity and safety of batteries. Accordingly, the microporous polyolefin membrane is required to have excellent mechanical properties, heat resistance, permeability, dimensional stability, shutdown properties, meltdown properties, etc.

In general, microporous membranes composed only of polyethylene have low meltdown temperatures, while microporous membranes composed only of polypropylene have high shutdown temperatures and poor mechanical strength. Accordingly, microporous membranes comprising polyethylene and polypropylene as main components are preferably for battery separators. To provide microporous membranes with improved mechanical strength, ultra-high-molecular-weight polyolefin is preferably added. For instance, JP3-64334A proposes a method for producing a microporous polyolefin membrane comprising (1) forming a gel-like molding comprising a composition containing ultra-high-molecular-weight polyolefin such that the ratio of (weight-average molecular weight/number-average molecular weight) is in a desired range, and a membrane-forming solvent, (2) stretching the gel-like molding without removing the solvent, and then (3) removing the solvent.

Japanese Patent 3348965 proposes a biaxially oriented microporous film made of a composition comprising 20-80% by mass of high-molecular-weight polyethylene having an intrinsic viscosity [η] of 10 dl/g or more, and 80-20% by mass of high-molecular-weight polypropylene having an intrinsic viscosity [η] of 3-15 dl/g, and having excellent closing temperature properties, rupture temperature properties, rigidity, tensile strength and air permeability.

However, microporous membranes comprising polyethylene and polypropylene, particularly those containing ultra-high-molecular-weight polyolefin, tend to be poor in such properties as thickness uniformity, etc. For instance, when ultra-high-molecular-weight polyethylene is added to microporous polyolefin membranes comprising high-molecular-weight polyethylene and high-molecular-weight polypropylene, the membranes tend to have sharkskin surfaces (see JP6-96753A). When microporous membranes having poor thickness uniformity are used as battery separators, they are likely to suffer short-circuiting, poor production yield, and poor cyclability due to low compression resistance.

In such circumstances, a microporous polyolefin membrane comprising polypropylene having MFR of 2.0 or less, and a polyethylene composition with weight-average molecular weight/number-average molecular weight of 8-100, the polypropylene content being 20% or less by mass was proposed (JP2002-194132A). Specifically, JP2002-194132A discloses a microporous polyolefin membrane comprising 30% by mass of powdery ultra-high-molecular-weight polyethylene having a weight-average molecular weight of $2.0\times10^6$, 65% by mass of powdery high-density polyethylene having a weight-average molecular weight of $3.0\times10^5$ (a polyethylene composition composed of the ultra-high-molecular-weight polyethylene and the high-density polyethylene having Mw/Mn of 20.5), and 5% by mass of a pelletized propylene homopolymer having a weight-average molecular weight of $6.0\times10^5$ and MFR of 0.5. This microporous polyolefin membrane has excellent thickness uniformity and good production yield.

As microporous polyolefin membranes having well-balanced thickness uniformity, heat resistance, mechanical properties, permeability, dimensional stability, shutdown properties, meltdown properties, and compression resistance, JP2004-196870A proposes microporous polyolefin membrane composed of polyethylene, and polypropylene having a weight-average molecular weight of $5\times10^5$ or more and a heat of fusion (measured by differential scanning calorimeter) of 90 J/g or more, the polypropylene content being 20% or less by mass, and JP2004-196871A proposes a microporous polyolefin membrane composed of polyethylene, and polypropylene having a weight-average molecular weight of $5\times10^5$ or more, and a melting point (measured by a differential scanning calorimeter at a temperature-elevating speed of 3-20° C./min) of 163° C. or higher, the polypropylene content being 20% or less by mass. However, the meltdown properties of any of the microporous polyolefin membranes disclosed by JP2002-194132A, JP2004-196870A and JP2004-196871A are not necessarily satisfactory, because of the polypropylene content of 20% or less by mass.

If the polypropylene content were increased in microporous polyolefin membranes comprising polyethylene and polypropylene, until sufficient meltdown properties (specifically meltdown temperatures higher than 175° C.) can be obtained, the membranes would be likely to have decreased permeability and prick resistance. Thus, the microporous membranes for battery separators comprising polyethylene and polypropylene are required to have high meltdown temperatures and well-balanced permeability and mechanical properties.

SUMMARY OF THE INVENTION

Accordingly, an aspect of the present invention is to provide a microporous polyolefin membrane comprising a polyethylene resin and a sufficient amount of polypropylene and having well-balanced permeability, mechanical properties and meltdown properties, its production method, and a battery separator composed of such microporous polyolefin membrane.

The inventors have found that (1) a microporous polyolefin membrane having excellent meltdown properties can be obtained from a polyolefin composition comprising a polyethylene resin, and polypropylene having a weight-average molecular weight of $6\times10^5$ or more, and a heat of fusion ΔHm (measured by a differential scanning calorimeter) of 90 J/g or more, a fraction having a molecular weight of $1.8\times10^6$ or more being 10% or more by mass, and (2) by extruding a molten blend of a polyethylene resin, polypropylene having a weight-average molecular weight of $6\times10^5$ or more, and a heat of fusion ΔHm (measured by a differential scanning calorimeter) of 90 J/g or more, a fraction having a molecular weight of $1.8\times10^6$ or more being 10% or more by mass, and a membrane-forming solvent from a die, cooling the extrudate to form a gel-like sheet, and conducting the stretching of the gel-like sheet and the removal of the membrane-forming solvent one or more times in an arbitrary order, a microporous polyolefin membrane having well-balanced permeability, mechanical properties and meltdown properties can be obtained even if it has a large polypropylene content. The present invention has been completed based on such findings.

Thus, the microporous polyolefin membrane of the present invention comprises a polyethylene resin, and polypropylene having a weight-average molecular weight of $6\times10^5$ or more and a heat of fusion of 90 J/g or more (measured by a differential scanning calorimeter), a fraction having a molecular weight of $1.8\times10^6$ or more being 10% or more by mass of the polypropylene.

The method of present invention for producing a microporous polyolefin membrane comprises the steps of (1) extruding a molten blend of a polyethylene resin, polypropylene having a weight-average molecular weight of $6\times10^5$ or more and a heat of fusion of 90 J/g or more (measured by a differential scanning calorimeter), a fraction having a molecular weight of $1.8\times10^6$ or more being 10% or more by mass of said polypropylene, and a membrane-forming solvent from a die, (2) cooling the resultant extrudate to a gel-like sheet, and (3) conducting the stretching of said gel-like sheet and the removal of said membrane-forming solvent one or more times in an arbitrary order.

The battery separator of the present invention is formed by a microporous polyolefin membrane comprising a polyethylene resin, and polypropylene having a weight-average molecular weight of $6\times10^5$ or more and a heat of fusion of 90 J/g or more (measured by a differential scanning calorimeter), a fraction having a molecular weight of $1.8\times10^6$ or more being 10% or more by mass of the polypropylene.

To obtain microporous polyolefin membranes having excellent properties, the polyolefin composition preferably meets the following conditions.

(1) The above polypropylene preferably has a weight-average molecular weight of $8\times10^5$ or more.

(2) Among the above polypropylene, a fraction having a molecular weight of $1.8\times10^6$ or more (determined from a molecular weight distribution) is preferably 15% or more by mass.

(3) The above polypropylene preferably has a heat of fusion of 95 J/g or more.

(4) The above polypropylene content is preferably 20-80% by mass of the entire polyolefin composition.

(5) The above polyethylene resin is preferably (a) ultra-high-molecular-weight polyethylene, (b) polyethylene other than the ultra-high-molecular-weight polyethylene, or (c) a polyethylene composition, a mixture of ultra-high-molecular-weight polyethylene, and polyethylene other than the ultra-high-molecular-weight polyethylene or polyolefin other than polyethylene and polypropylene.

(6) The above ultra-high-molecular-weight polyethylene preferably has a weight-average molecular weight of $5\times10^5$ or more.

(7) The weight-average molecular weight of the above ultra-high-molecular-weight polyethylene is more preferably $1\times10^6$-$15\times10^6$, particularly $1\times10^6$-$5\times10^6$.

(8) The above ultra-high-molecular-weight polyethylene is preferably an ethylene homopolymer, or an ethylene.α-olefin copolymer containing a small amount of an α-olefin other than ethylene.

(9) Any of the above a polyethylene resins preferably has a weight-average molecular weight of $2\times10^5$ or more, and Mw/Mn of 5-300.

(10) The above polyethylene composition preferably comprises (a) ultra-high-molecular-weight polyethylene having a weight-average molecular weight of $5\times10^5$ or more, and (b) at least one selected from the group consisting of polyethylene having a weight-average molecular weight of $1\times10^4$ or more and less than $5\times10^5$, polybutene-1 having a weight-average molecular weight of $1\times10^4$-$4\times10^6$, a polyethylene wax having a weight-average molecular weight of $1\times10^3$-$1\times10^4$ and an ethylene.α-olefin copolymer having a weight-average molecular weight of $1\times10^4$-$4\times10^6$.

(11) The polyethylene composition described in (10) above preferably comprises ultra-high-molecular-weight polyethylene having a weight-average molecular weight of $5\times10^5$ or more, and polyethylene having a weight-average molecular weight of $1\times10^4$ or more and less than $5\times10^5$.

(12) The polyethylene having a weight-average molecular weight of $1\times10^4$ or more and less than $5\times10^5$ in the polyethylene composition described in (11) above is preferably at least one selected from the group consisting of high-density polyethylene, medium-density polyethylene, branched low-density polyethylene, and linear low-density polyethylene.

(13) The polyethylene composition described in (12) above preferably comprises ultra-high-molecular-weight polyethylene having a weight-average molecular weight of $5\times10^5$ or more, and high-density polyethylene having a weight-average molecular weight of $1\times10^4$ or more and less than $5\times10^5$.

The microporous polyolefin membrane of the present invention having the above features preferably has a porosity of 25-80%, air permeability (converted to the value at 20-μm thickness) of 20-2,000 seconds/100 cc, prick resistance of 1,980 mN/20 μm or more, and a meltdown temperature of 170° C. or more, particularly 170-190° C.

The battery separator of the present invention is formed by the above microporous polyolefin membrane.

DETAILED DESCRIPTION OF THE INVENTION

[1] Polyolefin Composition

Figure 1:
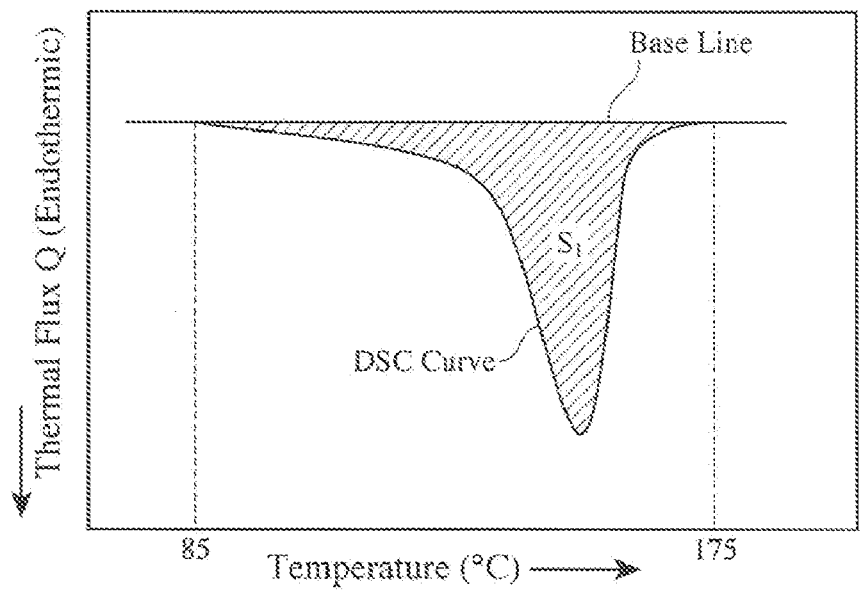
FIG. 1 is a graph showing a typical example of DSC curves.

The polyolefin composition forming the microporous polyolefin membrane of the present invention comprises as indispensable components (a) a polyethylene resin, (b) polypropylene having a weight-average molecular weight of $6\times10^5$ or more and a heat of fusion of 90 J/g or more (measured by a differential scanning calorimeter), a fraction having a molecular weight of $1.8\times10^6$ or more being 10% or more by mass.

(1) Polyethylene Resin

The polyethylene resin is (a) ultra-high-molecular-weight polyethylene, (b) polyethylene other than the ultra-high-molecular-weight polyethylene, or (c) a polyethylene composition, a mixture of ultra-high-molecular-weight polyethylene and the other polyethylene, or a mixture of ultra-high-molecular-weight polyethylene and polyolefin other than polyethylene and polypropylene. In any case, the polyethylene resin preferably has a weight-average molecular weight of $2\times10^5$ or more. When the weight-average molecular weight is less than $2\times10^5$, rupture is likely to occur when stretching the gel-like sheet, making it difficult to obtain a microporous polyolefin membrane having excellent properties.

(a) When it is Ultra-High-Molecular-Weight Polyethylene

The ultra-high-molecular-weight polyethylene has a weight-average molecular weight of $5\times10^5$ or more. The ultra-high-molecular-weight polyethylene may be an ethylene homopolymer, or an ethylene.α-olefin copolymer containing a small amount of the other α-olefin. The α-olefin other than ethylene is preferably propylene, butene-1, hexene-1, pentene-1,4-methylpentene-1, octene, vinyl acetate, methyl methacrylate, or styrene. The weight-average molecular weight of the ultra-high-molecular-weight polyethylene is preferably $1\times10^6$-$15\times10^6$, more preferably $1\times10^6$-$5\times10^6$.

(b) When it is Polyethylene Other than Ultra-High-Molecular-Weight Polyethylene

The polyethylene other than the ultra-high-molecular-weight polyethylene preferably has a weight-average molecular weight of $1\times10^4$ or more and less than $5\times10^5$, being at least one selected from the group consisting of high-density polyethylene, medium-density polyethylene, branched low-density polyethylene and linear low-density polyethylene. The polyethylene having a weight-average molecular weight of $1\times10^4$ or more and less than $5\times10^5$ may be an ethylene homopolymer, or a copolymer containing a small amount of the other α-olefin such as propylene, butene-1, hexene-1, etc. Such copolymer may be produced using a single-site catalyst.

(c) When it is Polyethylene Composition

The polyethylene composition is (i) a polyethylene composition comprising ultra-high-molecular-weight polyethylene having a weight-average molecular weight of $5\times10^5$ or more, and the other polyethylene, or (ii) a polyethylene composition comprising ultra-high-molecular-weight polyethylene having a weight-average molecular weight of $5\times10^5$ or more, and polyolefin other than polyethylene and polypropylene. The ultra-high-molecular-weight polyethylene and the other polyethylene may be the same as above. The other polyethylene preferably has a weight-average molecular weight of $1\times10^4$ or more and less than $5\times10^5$. The other polyolefin than polyethylene and polypropylene may be at least one selected from the group consisting of polybutene-1 having a weight-average molecular weight of $1\times10^4$-$4\times10^6$, a polyethylene wax having a weight-average molecular weight of $1\times10^3$-$10^4$, and an ethylene.α-olefin copolymer having a weight-average molecular weight of $1\times10^4$-$4\times10^6$. The amount of the ultra-high-molecular-weight polyethylene in the polyethylene composition is preferably 1% or more by mass, more preferably 1-80% by mass, based on 100 parts by mass of the entire polyethylene composition.

Preferable among them is a composition comprising the above ultra-high-molecular-weight polyethylene, and polyethylene having a weight-average molecular weight of $1\times10^4$ or more and less than $5\times10^5$, which is at least one selected from the group consisting of high-density polyethylene, medium-density polyethylene, branched low-density polyethylene, and linear low-density polyethylene. The molecular weight distribution (Mw/Mn) of this polyethylene composition can easily be controlled depending on application. Particularly preferable is a composition of ultra-high-molecular-weight polyethylene and high-density polyethylene.

(d) Molecular Weight Distribution Mw/Mn

Mw/Mn is a measure of a molecular weight distribution, and the larger this value, the wider the molecular weight distribution. Though not particularly restricted, the Mw/Mn of the polyethylene resin is preferably 5-300, more preferably 10-100, when the polyethylene resin is composed of ultra-high-molecular-weight polyethylene or a polyethylene composition. When the Mw/Mn is less than 5, the percentage of a high-molecular-weight component is too high, resulting in difficulty in melt extrusion. On the other hand, when the Mw/Mn is more than 300, the percentage of a low-molecular-weight component is too high, resulting in decrease in the strength of the microporous membrane. The Mw/Mn of polyethylene (homopolymer and ethylene.α-olefin copolymer) can be properly controlled by a multi-stage polymerization. The multi-stage polymerization method is preferably a two-stage polymerization method comprising forming a high-molecular-weight polymer component in the first stage, and forming a low-molecular-weight polymer component in the second stage. In the case of the polyethylene composition, the larger the Mw/Mn, the larger difference in a weight-average molecular weight exists between the ultra-high-molecular-weight polyethylene and the other polyethylene or polyolefin, and vice versa. The Mw/Mn of the polyethylene composition can be properly controlled by the molecular weights and mixing ratios of components.

(2) Polypropylene

Polypropylene should have a weight-average molecular weight of $6\times10^5$ or more, and a heat of fusion $\Delta H_m$ (measured by a differential scanning calorimeter (DSC) according to JIS K7122) of 90 J/g or more, a fraction having a molecular weight of $1.8\times10^6$ or more (determined from a molecular weight distribution) being 10% or more by mass. A temperature-elevating speed for the measurement of the heat of fusion is preferably 3-20° C./minute, usually 10° C./minute. Because polypropylene having a weight-average molecular weight of less than $6\times10^5$ has poor dispersibility in the polyethylene resin, its use makes stretching difficult and provides a microporous polyolefin membrane with large surface micro-roughness and thickness variation. When a fraction having a molecular weight of $1.8\times10^6$ or more is less than 10% by mass of the polypropylene, the microporous membrane has low prick resistance and permeability. When the polypropylene has a heat of fusion $\Delta H_m$ of less than 90 J/g, the resultant microporous membrane has low prick resistance and permeability, and particularly much low meltdown properties.

The weight-average molecular weight of polypropylene is preferably $8\times10^5$ or more. Though not particularly restricted, the Mw/Mn of the polypropylene is preferably 1-100. The heat of fusion $\Delta H_m$ of the polypropylene is preferably 95 J/g or more, more preferably 100 J/g or more.

The polypropylene content is preferably 20-80% by mass, more preferably 30-70% by mass, of the entire polyolefin composition. When the polypropylene content is less than 20% by mass, the meltdown temperature does not increase to a sufficient level. When the polypropylene content exceeds 80% by mass, the microporous membrane tends to have deteriorated thickness uniformity.

As long as the above conditions of the weight-average molecular weight, a fraction having a molecular weight of $1.8\times10^6$ or more (determined from a molecular weight distribution), and the heat of fusion are met, the type of the polypropylene is not particularly restrictive, but may be a propylene homopolymer, a copolymer of propylene and the other α-olefin, or a mixture thereof, the homopolymer being preferable. The copolymer may be a random or block copolymer. The α-olefins usable include ethylene, butene-1, pentene-1,4-methylpentene-1, octene, vinyl acetate, methyl methacrylate, styrene, etc.

[2] Production Method of Microporous Polyolefin Membrane

The method of the present invention for producing a microporous polyolefin membrane comprises a step (1) of melt-blending the polyethylene resin, the polypropylene and the membrane-forming solvent, a step (2) of extruding the resultant polyolefin solution from a die and cooling it to form a gel-like sheet, a step (3) of stretching the gel-like sheet and removing the membrane-forming solvent, and a step (4) of drying the resultant membrane. After the step (4), if necessary, (5) a heat treatment step, (6) a cross-linking step with ionizing radiations, (7) a hydrophilizing treatment step, etc. may be conducted.

(1) Preparation Step of Polyolefin Solution

A polyethylene resin, polypropylene and a membrane-forming solvent are melt-blended to prepare a polyolefin solution. The polyolefin solution may contain various additives such as antioxidants, ultraviolet absorbers, antiblocking agents, pigments, dyes, inorganic fillers, etc. in a range not deteriorating the effects of the present invention, if necessary. Fine silicate powder may be added as a pore-forming agent, for instance.

The membrane-forming solvent is preferably liquid at room temperature. The use of a liquid solvent makes it possible to conduct stretching at a relatively high magnification. The liquid solvents may be aliphatic or alicyclic hydrocarbons such as nonane, decane, decalin, p-xylene, undecane, dodecane, liquid paraffin, etc., mineral oil distillates having boiling points comparable to those of the above hydrocarbons, and phthalates liquid at room temperature such as dibutyl phthalate, dioctyl phthalate, etc. To obtain a gel-like sheet having a stable liquid solvent content, it is preferable to use non-volatile liquid solvents such as liquid paraffin. A solvent which is miscible with polyethylene in a melt-blended state but solid at room temperature may be mixed with the liquid solvent. Such solid solvent includes stearyl alcohol, ceryl alcohol, paraffin waxes, etc. However, when only a solid solvent is used, uneven stretching, etc. are likely to occur.

The viscosity of the liquid solvent is preferably 30-500 cSt, more preferably 30-200 cSt at a temperature of 25° C. When the viscosity at 25° C. is less than 30 cSt, the polyolefin solution is easily foamed, resulting in difficulty in blending. On the other hand, when the viscosity is more than 500 cSt, the removal of the liquid solvent is difficult.

Though not particularly restricted, the uniform melt-blending of the polyolefin solution is preferably conducted in a double-screw extruder. Melt-blending in the double-screw extruder is suitable for preparing a high-concentration polyolefin solution. The melt-blending temperature is preferably in a range of the melting point Tm of the polypropylene to Tm +70° C. Specifically, the melt-blending temperature is preferably 160-250° C., more preferably 180-230° C. The melting point is determined by differential scanning calorimetry (DSC) according to JIS K7121. The membrane-forming solvent may be added before blending, or charged into the double-screw extruder in an intermediate portion during blending, though it is preferably added before blending to prepare the solution in advance. In the melt-blending, an antioxidant is preferably added to prevent the oxidation of the polyolefin composition.

A ratio L/D of the screw length L to the screw diameter D in the double-screw extruder is preferably in a range of 20-100, more preferably in a range of 35-70. When L/D is less than 20, melt-blending is insufficient. When L/D is more than 100, the residing time of the polyolefin solution is too long. The cylinder of the double-screw extruder preferably has an inner diameter of 40-80 mm.

A ratio Q/Ns of the extrusion rate Q (kg/h) of the polyolefin solution to the number of revolutions [Ns (rpm)] of the screw in the double-screw extruder is preferably 0.3 kg/h/rpm or less. This improves the dispersibility of polypropylene in the microporous membrane, resulting in further improved thickness uniformity and heat resistance. The number of revolutions Ns of the screw is preferably 180 rpm or more. Though not particularly restricted, the upper limit of the number of revolutions Ns of the screw is preferably 500 rpm. Q/Ns is more preferably 0.25 kg/h/rpm or less. Though not particularly restricted, the lower limit of Q/Ns is preferably 0.01 kg/h/rpm. Q/Ns can be controlled by selecting the shape of the screw (for instance, diameter, depth of grooves at the exit, etc.).

The amount of the polyolefin composition is preferably 1-50% by mass, more preferably 20-40% by mass, per 100% by mass of the polyolefin solution. When the polyolefin composition is less than 1% by mass, large swelling or neck-in occurs at the die exit during the extrusion of the polyolefin composition solution, resulting in decrease in the formability and self-support of the gel-like molding. On the other hand, when the polyolefin composition is more than 50% by weight, the formability of the gel-like molding is deteriorated.

(2) Formation Step of Gel-Like Sheet

The melt-blended polyolefin solution is extruded through a die directly from the extruder or via another extruder, or via another extruder after once cooled and pelletized. The die used is usually a sheet-forming die having a rectangular-cross-section orifice, though a double-cylindrical hollow die, an inflation die lip, etc. may also be used. In the case of the sheet-forming die, the die gap is usually 0.1 to 5 mm, and it is heated at 140-250° C. during extrusion. The extrusion speed of the heated solution is preferably 0.2 to 15 m/minute.

The polyolefin solution extruded from the die is formed into a gel-like molding by cooling. Cooling is preferably conducted at least to a gelation temperature or lower at a speed of 50° C./minute or more. Cooling is preferably conducted to 25° C. or lower. Such cooling can set the microphases of the polyolefin composition phase separated by the membrane-forming solvent. Generally, the slower cooling speed provides the gel-like sheet with larger pseudo-cell units, resulting in a coarser higher-order structure. On the other hand, the higher cooling speed results in denser cell units. The cooling speed less than 50° C./minute leads to increased crystallinity, making it unlikely to provide the gel-like sheet with suitable stretchability. Usable as the cooling method are a method of bringing the gel-like sheet into direct contact with a cooling medium such as cooling air, cooling water, etc., a method of bringing the gel-like sheet into contact with rolls cooled by a cooling medium, etc.

(3) Step of Stretching and Removing Membrane-Forming Solvent

This step is carried out by (a) removing the liquid solvent after the stretching of the gel-like sheet, (b) stretching the gel-like sheet after the removal of the liquid solvent from the gel-like sheet, or (c) stretching the gel-like sheet and then removing the liquid solvent, and further stretching the gel-like sheet.

The gel-like sheet is stretched to a predetermined magnification after heated, by a tenter method, a roll method, an inflation method, rolling method or a combination thereof. The stretching may be conducted monoaxially or biaxially, though the biaxial stretching is preferable. In the case of biaxial orientation, any of simultaneous biaxial stretching, sequential stretching or multi-stage stretching (for instance, a combination of the simultaneous biaxial stretching and the sequential stretching) may be used, though the simultaneous biaxial stretching is preferable. The stretching improves the mechanical strength of the membrane.

The stretching magnification is preferably 2 folds or more, more preferably 3-30 folds in the monoaxial stretching. In the biaxial stretching, the stretching magnification is preferably 3 folds or more in any direction, namely 9 folds or more in area magnification, more preferably 25 folds or more in area magnification. With the area magnification of 9 folds or more, the prick resistance of the membrane is improved. When the area magnification is more than 400 folds, stretching apparatuses, stretching operations, etc. are restricted.

Regardless of whether the polyethylene resin is a homopolymer or a copolymer when it is ultra-high-molecular-weight polyethylene or the other polyethylene (not the composition), the stretching temperature is preferably the melting point of the polyethylene resin +10° C. or lower, more preferably in a range of the crystal dispersion temperature or higher and lower than the crystal melting point. When the stretching temperature is higher than the melting point +10° C., the polyethylene is molten, failing to orient molecular chains by stretching. When the stretching temperature is lower than the crystal dispersion temperature, the polyethylene resin is so insufficiently softened that the membrane is easily broken by stretching, failing to achieve high-magnification stretching. When a sequential stretching or a multi-stage stretching is conducted, primary stretching may be conducted at a lower temperature than the crystal dispersion temperature. The "crystal dispersion temperature" is determined by measuring the temperature characteristics of the kinetic viscoelasticity according to ASTM D 4065. The ultra-high-molecular-weight polyethylene and the other polyethylene have crystal dispersion temperatures of about 90-100° C.

In the case of the polyethylene composition, the stretching temperature is preferably in a range of the crystal dispersion temperature of the polyethylene composition or higher and the crystal melting point of the polyethylene composition +10° C. or lower. The stretching temperature is usually 100-140° C., preferably 110-120° C.

Depending on desired properties, stretching may be conducted with a temperature distribution in a thickness direction, or sequential or multi-stage stretching may be conducted with primary stretching at relatively low temperatures and secondary stretching at higher temperatures. The stretching with a temperature distribution in a thickness direction generally provides a microporous polyolefin membrane with excellent mechanical strength. The detailed description of this method is given by JP7-188440A.

For the purpose of removing (washing away) the liquid solvent, a washing solvent is used. Because a polyolefin composition phase is separated from the membrane-forming solvent, the removal of the liquid solvent provides a porous membrane. The removal (washing away) of the liquid solvent can be conducted by using known washing solvents. The washing solvents include, for instance, volatile solvents such as saturated hydrocarbons such as pentane, hexane, heptane, etc., chlorinated hydrocarbons such as methylene chloride, carbon tetrachloride, etc., ethers such as diethyl ether, dioxane, etc., ketones such as methyl ethyl ketone, etc., linear fluorocarbons such as trifluoroethane, $C_6F_{14}$, $C_7F_{16}$, etc., cyclic hydrofluorocarbons such as $C_5H_3F_7$, etc., hydrofluoroethers such as $C_4F_9OCH_3$, $C_4F_9OC_2H_5$, etc., perfluoroethers such as $C_4F_9OCF_3$, $C_4F_9OC_2F_5$, etc. These washing solvents have low surface tension (for instance, 24 mN/m or less at 25° C.). The use of a washing solvent with low surface tension prevents the pore-forming network structure from shrinking by surface tension in a gas-liquid interface during drying after washing, thereby providing the microporous polyolefin membrane with high porosity and permeability.

The washing of the membrane after stretching or the gel-like sheet before stretching can be conducted by immersion in the washing solvent and/or the showering of the washing solvent. The washing solvent used is preferably 300-30,000 parts by mass per 100 parts by mass of the stretched membrane or the gel-like sheet. Washing is preferably conducted until the amount of the remaining liquid solvent becomes less than 1% by mass of that added.

(4) Drying Step of Membrane

The microporous polyolefin membrane obtained by stretching and the removal of the membrane-forming solvent is dried by a heat-drying method, a wind-drying method, etc. The drying temperature is preferably equal to or lower than the crystal dispersion temperature of the polyethylene resin, particularly 5° C. or more lower than the crystal dispersion temperature. Drying is conducted until the remaining washing solvent becomes preferably 5% or less by mass, more preferably 3% or less by mass, per 100% by mass (on a dry basis) of the microporous membrane. Insufficient drying undesirably leads to decrease in the porosity of the microporous membrane by a subsequent heat treatment, resulting in poor permeability.

(5) Heat Treatment Step

The dried microporous membrane is preferably heat-treated. The heat treatment stabilizes crystals, resulting in uniform lamella layers. The heat treatment method may be a heat-stretching treatment, a heat-setting treatment and/or a heat-shrinking treatment, which may be properly selected depending on the required properties. The heat treatment is conducted at a temperature equal to or lower than the melting point of the polyethylene resin, preferably at a temperature between 60° C. and (the melting point +10° C.).

The heat-stretching treatment and the heat-setting treatment are conducted more preferably by a tenter method, a roll method or a rolling method. In the case of heat-stretching treatment, the stretching magnification is preferably 1.01-2.0 folds, more preferably 1.01-1.5 folds, in at least one direction. The heat-shrinking treatment may be conducted by using a belt conveyer or an air-floating heating furnace, in addition to the above methods. In the heat-shrinking treatment, the shrinkage ratio is preferably 50% or less, more preferably 30% or less, in at least one direction.

The heat-stretching treatment improves the permeability of the microporous polyolefin membrane and increases its pore diameters. A heat-setting treatment is preferably conducted further after the heat-stretching treatment. When the heat-shrinking treatment is conducted after the heat-stretching treatment, the resultant microporous polyolefin membrane is provided with a low shrinkage ratio and high strength.

(6) Cross-Linking Treatment Step of Membrane

Regardless of whether the heat treatment is conducted, ionizing radiation rays such as α-rays, β-rays, γ-rays, electron beams, etc. are preferably irradiated onto the microporous polyolefin membrane to conduct a cross-linking treatment. In the case of irradiating electron beams, the amount of electron beams is preferably 0.1-100 Mrad, and the accelerating voltage is preferably 100-300 kV. The cross-linking treatment elevates the meltdown temperature of the microporous polyolefin membrane.

(7) Hydrophilizing Treatment Step

The microporous polyolefin membrane may be subjected to a hydrophilizing treatment (treatment of imparting hydrophilic property). The hydrophilizing treatment may be a monomer-grafting treatment, a surfactant treatment, a corona-discharging treatment, etc. The monomer-grafting treatment is preferably conducted after the cross-linking treatment.

In the case of the surfactant treatment, any of nonionic surfactants, cationic surfactants, anionic surfactants and amphoteric surfactants may be used, and the nonionic surfactants are preferred. The microporous polyolefin membrane is dipped in a solution of the surfactant in water or a lower alcohol such as methanol, ethanol, isopropyl alcohol, etc., or coated with the solution by a doctor blade method.

[3] Microporous Polyolefin Membrane

The microporous polyolefin membrane obtained by the above method has the following properties.

(1) Porosity of 25-80%

When the porosity is less than 25%, the microporous polyolefin membrane does not have good air permeability. When the porosity exceeds 80%, it is difficult to provide batteries with well-balanced safety and impedance.

(2) Air permeability of 20-2,000 seconds/100 cc (converted to the value at 20-μm thickness)

When the air permeability is 20-2,000 seconds/100 cc, batteries with separators formed by the microporous polyolefin membrane have large capacity and good cycle characteristics. When the air permeability exceeds 2,000 seconds/100 cc, the batteries have decreased capacity. When the air permeability is less than 20 seconds/100 cc, shutdown is unlikely to occur when the temperatures inside the batteries are elevated.

(3) Prick resistance of 1,980 mN/20 μm or more

When the prick resistance is less than 1,980 mN/20 μm, short-circuiting is likely to occur in batteries with separators formed by the microporous polyolefin membrane.

(4) Meltdown temperature of 170° C. or more

The meltdown temperature is preferably 170-190° C.

(5) Shutdown temperature of 120-140° C.

The temperature at which the air permeability of the microporous polyolefin membrane reaches 100,000 seconds/100 cc is defined as a shutdown temperature.

[4] Battery Separator

The battery separator formed by the above microporous polyolefin membrane preferably has a thickness of 3-200 μm, more preferably 5-50 μm, though properly selectable depending on the types of batteries.

The present invention will be explained in more detail referring to Examples below without intention of restricting the scope of the present invention.

EXAMPLE 1

100 parts by mass of a polyolefin composition comprising 1% by mass of ultra-high-molecular-weight polyethylene (UHMWPE) having a weight-average molecular weight (Mw) of $2.5 \times 10^6$, 49% by mass of high-density polyethylene (HDPE) having Mw of $3.0 \times 10^5$, and 50% by mass of a propylene homopolymer (PP) having Mw of $2.69 \times 10^6$, Mw/Mn of 3.5, and a heat of fusion of 99.9 J/g, a fraction having a molecular weight of $1.8 \times 10^6$ or more being 57.2% by mass per PP), and 1.0 parts by mass of tetrakis[methylene-3-(3,5-ditertiary-butyl-4-hydroxyphenyl)-propionate]methane as an antioxidant were dry-blended to form a polyolefin composition. Measurement revealed that a polyethylene composition of UHMWPE and HDPE had a melting point of 135° C., and a crystal dispersion temperature of 90° C.

The Mw and Mw/Mn of UHMWPE and HDPE were measured by a gel permeation chromatography (GPC) method under the following conditions.

Measurement apparatus: GPC-150C available from Waters Corporation,
Column: Shodex UT806M available from Showa Denko K. K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 μl,
Detector: Differential Refractometer available from Waters Corp., and
Calibration curve: Produced from a calibration curve of a single-dispersion, standard polystyrene sample using a predetermined conversion constant.

The Mw and Mw/Mn of the PP were measured by a gel permeation chromatography (GPC) method under the following conditions.

Measurement apparatus: Alliance 2000 GPC available from Waters Corp.,
Column: PL Gel mixed-B available from Polymer Laboratories,
Column temperature: 145° C.,
Solvent (mobile phase): 1,2,4-trichlorobenzene,
Solvent flow rate: 1.0 ml/minute,
Sample concentration: 0.25 mg/mL (dissolved at 175° C. for 1 hour),
Injected amount: 300 μl,
Detector: Differential Refractometer available from Waters Corp., and
Calibration curve: Produced from a calibration curve of a single-dispersion, standard polystyrene sample using a predetermined conversion constant.

The heat of fusion $\Delta H_m$ of polypropylene (PP) was measured according to JIS K7122 as follows: A polypropylene sample was heat-treated at 190° C. for 10 minutes in a nitrogen atmosphere in a sample holder of a differential scanning calorimeter (DSC-System 7 available from Perkin Elmer, Inc.), cooled to 40° C. at a speed of 10° C./minute, kept at 40° C. for 2 minutes, and heated to 190° C. at a speed of 10° C./minute. As shown in FIG. 1, a straight line passing through points on a DSC curve (melting curve) obtained by the temperature-elevating process at 85° C. and 175° C. was drawn as a base line, and the amount of heat was calculated from an area $S_1$ of a hatched portion encircled by the base line and the DSC curve. The amount of heat (unit: J) was divided by the weight (unit: g) of the sample to determine the heat of fusion $\Delta H_m$ (unit: J/g).

Figure 2:
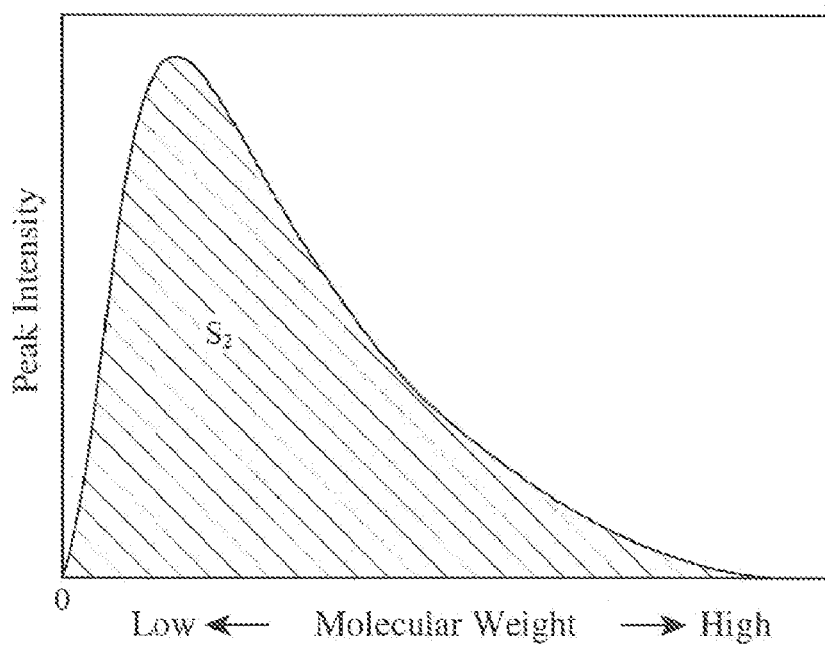
FIG. 2 is a graph showing a typical example of GPC curves.
Figure 3:
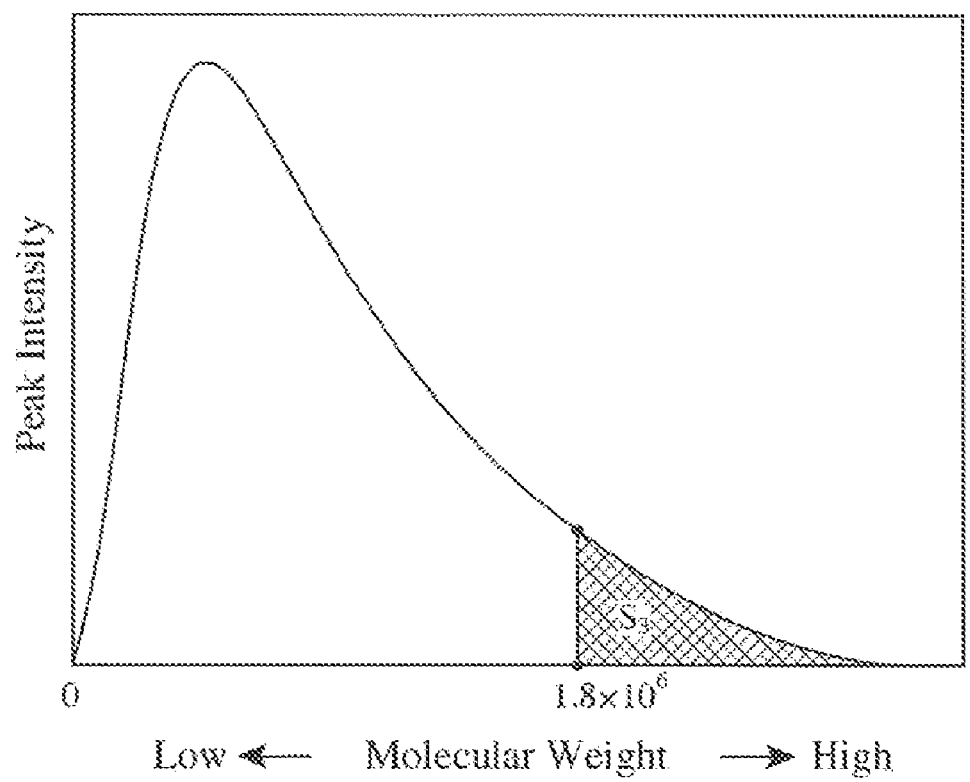
FIG. 3 is a graph showing the same GPC curve as in FIG. 2 in which a high-molecular-weight fraction is hatched.

The percentage (on a mass basis) of a portion having a molecular weight of $1.8 \times 10^6$ or more to the entire PP was determined as follows: To determine the amount of the entire PP, an area $S_2$ of a hatched portion encircled by the GPC curve and the base line in FIG. 2 was measured. To determine the amount of the portion having a molecular weight of $1.8 \times 10^6$ or more, an area $S_3$ in FIG. 3 was measured. The percentage of a fraction having a molecular weight of $1.8 \times 10^6$ or more was calculated by $(S_3/S_2) \times 100$ (% by mass).

35 parts by mass of the polyolefin composition was charged into a strong-blending double-screw extruder having an inner diameter of 58 mm and L/D of 42, and 65 parts by mass of a liquid paraffin [50 cst (25° C.)] was supplied to the double-screw extruder via a side feeder. Melt blending was conducted at 210° C. and 200 rpm to prepare a polyolefin solution. This polyolefin solution was extruded from a T die mounted to a tip end of the double-screw extruder at a rate Q of 8 kg/h with the number Ns of revolutions of the screw kept at 200 rpm (Q/Ns: 0.04 kg/h/rpm), and cooled by cooling rolls controlled at 5° C. to form a gel-like sheet.

Using a tenter-stretching machine, the gel-like sheet was simultaneously biaxially stretched at 118° C. at a stretching speed of 22%/second in both machine direction (MD) and transverse direction (TD), such that the stretching magnification was 5 folds in both MD and TD. The stretching speed (%/second) is represented by the percentage of the length of the gel-like sheet increasing per 1 second in a stretching direction, assuming that the length of the gel-like sheet before stretched is 100%. The stretched membrane was fixed to an aluminum frame of 20 cm×20 cm, and immersed in methylene chloride [surface tension: 27.3 mN/m (25° C.), boiling point: 40.0° C.] controlled at 25° C., and washed with the vibration of 100 rpm for 3 minutes. The resultant membrane was air-cooled at room temperature, and heat-set at 125° C. for 5 minutes while being fixed to a tenter, to produce a microporous polyolefin membrane.

EXAMPLE 2

A microporous polyolefin membrane was produced in the same manner as in Example 1, except for using, as the polypropylene, a propylene homopolymer having Mw of $1.82 \times 10^6$, Mw/Mn of 2.6, and a heat of fusion of 107.2 J/g, a fraction having a molecular weight of $1.8 \times 10^6$ or more being 34.9% by mass of the propylene homopolymer.

EXAMPLE 3

A microporous polyolefin membrane was produced in the same manner as in Example 1, except for using, as the polypropylene, a propylene homopolymer having Mw of $1.40 \times 10^6$, Mw/Mn of 2.6, and a heat of fusion of 111.6 J/g, a fraction having a molecular weight of $1.8 \times 10^6$ or more being 25.3% by mass of the propylene homopolymer.

EXAMPLE 4

A microporous polyolefin membrane was produced in the same manner as in Example 1, except that a propylene homopolymer used as the polypropylene had Mw of $9.0 \times 10^5$, Mw/Mn of 2.4, and a heat of fusion of 109.7 J/g, a fraction having a molecular weight of $1.8 \times 10^6$ or more being 10.8% by mass per the propylene homopolymer, and that the polyolefin composition comprised 1.4% by mass of UHMWPE, 68.6% by mass of HDPE and 30% by mass of PP.

EXAMPLE 5

A microporous polyolefin membrane was produced in the same manner as in Example 1, except for using, as the polypropylene, a propylene homopolymer having Mw of $9.1 \times 10^5$, Mw/Mn of 2.4, and a heat of fusion of 108.5 J/g, a fraction having a molecular weight of $1.8 \times 10^6$ or more being 11.1% by mass per the propylene homopolymer.

EXAMPLE 6

A microporous polyolefin membrane was produced in the same manner as in Example 1, except that the same propylene homopolymer as in Example 4 was used as the polypropylene, and that the polyolefin composition comprised 0.6% by mass of UHMWPE, 29.4% by mass of HDPE and 70% by mass of PP.

EXAMPLE 7

A microporous polyolefin membrane was produced in the same manner as in Example 1, except that the same propylene homopolymer as in Example 4 was used as the polypropylene, and that the polyolefin composition comprised 15% by mass of UHMWPE, 35% by mass of HDPE and 50% by mass of PP.

EXAMPLE 8

A microporous polyolefin membrane was produced in the same manner as in Example 1, except that the same propylene homopolymer as in Example 4 was used as the polypropylene, and that the polyolefin composition comprised 50% by mass of HDPE and 50% by mass of PP without UHMWPE.

EXAMPLE 9

A microporous polyolefin membrane was produced in the same manner as in Example 1, except that the same propylene homopolymer as in Example 4 was used as the polypropylene, and that the UHMWPE used had Mw of $1.2 \times 10^6$.

EXAMPLE 10

A microporous polyolefin membrane was produced in the same manner as in Example 1, except that the same propylene homopolymer as in Example 4 was used as the polypropylene, that the UHMWPE used had Mw of $1.2 \times 10^6$, and that the polyolefin composition comprised 50% by mass of UHMWPE and 50% by mass of PP without HDPE.

COMPARATIVE EXAMPLE 1

A microporous polyolefin membrane was produced in the same manner as in Example 1, except for using, as the polypropylene, a propylene homopolymer having Mw of $6.8 \times 10^5$, Mw/Mn of 5.9, and a heat of fusion of 94.6 J/g, a fraction having a molecular weight of $1.8 \times 10^6$ or more being 6.7% by mass per the propylene homopolymer.

COMPARATIVE EXAMPLE 2

A microporous polyolefin membrane was produced in the same manner as in Example 1, except that a propylene homopolymer used as the polypropylene had Mw of $1.56 \times 10^6$, Mw/Mn of 3.2, and a heat of fusion of 78.4 J/g, a fraction having a molecular weight of $1.8 \times 10^6$ or more being 27.1% by mass per the propylene homopolymer, and that the heat-setting temperature was 118° C.

COMPARATIVE EXAMPLE 3

An attempt was conducted to produce a microporous polyolefin membrane in the same manner as in Example 1, except for using, as the polypropylene, a propylene homopolymer having Mw of $3.0 \times 10^5$, Mw/Mn of 4.9, and a heat of fusion of 95.9 J/g, a fraction having a molecular weight of $1.8 \times 10^6$ or more being 0% by mass per the propylene homopolymer, that the polyolefin composition comprised 1.4% by mass of UHMWPE, 68.6% by mass of HDPE and 30% by mass of PP, and that the heat-setting temperature was 118° C. However, because of poor dispersibility of polypropylene, the microporous polyolefin membrane was broken when stretched.

COMPARATIVE EXAMPLE 4

A microporous polyolefin membrane was produced in the same manner as in Example 1, except that a propylene homopolymer used as the polypropylene had Mw of $6.6 \times 10^5$, Mw/Mn of 11.4, and a heat of fusion of 103.3 J/g, a fraction having a molecular weight of $1.8 \times 10^6$ or more being 7.7% by mass per the propylene homopolymer, and that the heat-setting temperature was 118° C.

COMPARATIVE EXAMPLE 5

A microporous polyolefin membrane was produced in the same manner as in Example 1, except that the same propylene homopolymer as in Comparative Example 1 was used as the polyolefin, and that the polyolefin composition comprised 70% by mass of HDPE and 30% by mass of PP without UHMWPE.

The properties of the microporous polyolefin membranes produced in Examples 1-5 and Comparative Examples 1-5 were measured by the following methods.

(1) Average Thickness (μm)

The thickness of the microporous polyolefin membrane was measured by a contact thickness meter at an arbitrary MD position over the length of 30 cm in a transverse direction (TD) at 5-mm intervals, and averaged.

(2) Air Permeability (sec/100 cc/20 μm)

Air permeability $P_1$ measured on a microporous polyolefin membrane having a thickness $T_1$ accordingly JIS P8117 was converted to air permeability $P_2$ at a thickness of 20 μm by the formula of $P_2 = (P_1 \times 20)/T_1$.

(3) Porosity (%)

Measured by a weight method.

(4) Prick Resistance (mN/20 μm)

The maximum load was measured, when a microporous polyolefin membrane having a thickness of $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the formula of $L_2 = (L_1 \times 20)/T_1$, and used as prick resistance.

(5) Meltdown Temperature (° C.)

A microporous polyolefin membrane of 5 cm×5 cm was sandwiched by blocks each having a circular opening of 12 mm in diameter, and a tungsten carbide ball of 10 mm in diameter was placed on the microporous polyolefin membrane in the circular opening. While heating at a temperature-elevating speed of 5° C./minute, the temperature at which the microporous polyolefin membrane was ruptured by melting was measured.

TABLE 1

| | Example 1 | Example 2 | Example 3 | Example 4 | Example 5 | Example 6 | Example 7 | Example 8 |
|---|---|---|---|---|---|---|---|---|
| Polyolefin Composition | | | | | | | | |
| UHMWPE | | | | | | | | |
| Mw[1] | $2.5 \times 10^6$ | $2.5 \times 10^6$ | $2.5 \times 10^6$ | $2.5 \times 10^6$ | $2.5 \times 10^6$ | $2.5 \times 10^6$ | $2.5 \times 10^6$ | — |
| Content (wt. %) | 1 | 1 | 1 | 1.4 | 1 | 0.6 | 15 | — |
| HDPE | | | | | | | | |
| Mw[1] | $3.0 \times 10^5$ | $3.0 \times 10^5$ | $3.0 \times 10^5$ | $3.0 \times 10^5$ | $3.0 \times 10^5$ | $3.0 \times 10^5$ | $3.0 \times 10^5$ | $3.0 \times 10^5$ |
| Content (wt. %) | 49 | 49 | 49 | 68.6 | 49 | 29.4 | 35 | 50 |
| PP | | | | | | | | |
| Mw[1] | $2.69 \times 10^6$ | $1.82 \times 10^6$ | $1.40 \times 10^6$ | $9.0 \times 10^5$ | $9.1 \times 10^5$ | $9.0 \times 10^5$ | $9.0 \times 10^5$ | $9.0 \times 10^5$ |
| HMW Fraction[2] | 57.2 | 34.9 | 25.3 | 10.8 | 11.1 | 10.8 | 10.8 | 10.8 |
| Mw/Mn[3] | 3.5 | 2.6 | 2.6 | 2.4 | 2.4 | 2.4 | 2.4 | 2.4 |
| Heat of Fusion (J/g) | 99.9 | 107.2 | 111.6 | 109.7 | 108.5 | 109.7 | 109.7 | 109.7 |
| Content (wt. %) | 50 | 50 | 50 | 30 | 50 | 70 | 50 | 50 |
| Production Conditions | | | | | | | | |
| Concentration of Polyolefin Composition (wt. %) | 35 | 35 | 35 | 35 | 35 | 35 | 35 | 35 |
| Extrusion | | | | | | | | |
| Ns[4] (rpm) | 200 | 200 | 200 | 200 | 200 | 200 | 200 | 200 |
| Q[5] (kg/h) | 8 | 8 | 8 | 8 | 8 | 8 | 8 | 8 |
| Q/Ns (kg/h/rpm) | 0.04 | 0.04 | 0.04 | 0.04 | 0.04 | 0.04 | 0.04 | 0.04 |
| Stretching of Gel-Like Sheet | | | | | | | | |
| Temperature (° C.) | 118 | 118 | 118 | 118 | 118 | 118 | 118 | 118 |
| Magnification (MD × TD) | 5 × 5 | 5 × 5 | 5 × 5 | 5 × 5 | 5 × 5 | 5 × 5 | 5 × 5 | 5 × 5 |
| Stretching Speed (MD × TD)[6] | 22 × 22 | 22 × 22 | 22 × 22 | 22 × 22 | 22 × 22 | 22 × 22 | 22 × 22 | 22 × 22 |
| Heat-Setting Treatment | | | | | | | | |
| Temperature (° C.) | 125 | 125 | 125 | 125 | 125 | 125 | 125 | 125 |
| Time (minute) | 5 | 5 | 5 | 5 | 5 | 5 | 5 | 5 |
| Properties of Microporous Membrane | | | | | | | | |
| Thickness (μm) | 27.8 | 39.0 | 29.3 | 30.8 | 36.4 | 26.0 | 31.4 | 22.3 |
| Air Permeability[7] | 1898 | 1150 | 877 | 337 | 934 | 1230 | 939 | 825 |
| Porosity (%) | 34.0 | 35.0 | 37.3 | 53.6 | 35.7 | 36.9 | 37.4 | 37.9 |
| Prick Resistance (gf/20 μm) | 475 | 370 | 387 | 202 | 368 | 363 | 375 | 424 |
| (mN/20 μm) | 4655 | 3626 | 3793 | 1980 | 3606 | 3557 | 3675 | 4155 |
| Meltdown Temperature (° C.) | 180.3 | 177.8 | 181.5 | 173.1 | 175.9 | 176.9 | 177.1 | 174.9 |

TABLE 1-continued

| | Example 9 | Example 10 | Comparative Example 1 | Comparative Example 2 | Comparative Example 3 | Comparative Example 4 | Comparative Example 5 |
|---|---|---|---|---|---|---|---|
| Polyolefin Composition | | | | | | | |
| UHMWPE | | | | | | | |
| Mw[1] | $1.2 \times 10^6$ | $1.2 \times 10^6$ | $2.5 \times 10^6$ | $2.5 \times 10^6$ | $2.5 \times 10^6$ | $2.5 \times 10^6$ | — |
| Content (wt. %) | 1 | 50 | 1 | 1 | 1.4 | 1 | — |
| HDPE | | | | | | | |
| Mw[1] | $3.0 \times 10^5$ | — | $3.0 \times 10^5$ | $3.0 \times 10^5$ | $3.0 \times 10^5$ | $3.0 \times 10^5$ | $3.0 \times 10^5$ |
| Content (wt. %) | 49 | — | 49 | 49 | 68.6 | 49 | 70 |
| PP | | | | | | | |
| Mw[1] | $9.0 \times 10^5$ | $9.0 \times 10^5$ | $6.8 \times 10^5$ | $1.56 \times 10^6$ | $3.0 \times 10^5$ | $6.6 \times 10^5$ | $6.8 \times 10^5$ |
| HMW Fraction[2] | 10.8 | 10.8 | 7.4 | 27.1 | 0 | 8.2 | 7.4 |
| Mw/Mn[3] | 2.4 | 2.4 | 5.9 | 3.2 | 4.9 | 11.4 | 5.9 |
| Heat Of Fusion (J/g) | 109.7 | 109.7 | 94.6 | 78.4 | 95.9 | 103.3 | 94.6 |
| Content (wt. %) | 50 | 50 | 50 | 50 | 30 | 50 | 30 |
| Production Conditions | | | | | | | |
| Concentration of Polyolefin Composition (wt. %) | 35 | 35 | 35 | 35 | 35 | 35 | 35 |
| Extrusion | | | | | | | |
| Ns[4] (rpm) | 200 | 200 | 200 | 200 | 200 | 200 | 200 |
| Q[5] (kg/h) | 8 | 8 | 8 | 8 | 8 | 8 | 8 |
| Q/Ns (kg/h/rpm) | 0.04 | 0.04 | 0.04 | 0.04 | 0.04 | 0.04 | 0.04 |
| Stretching of Gel-Like Sheet | | | | | | | |
| Temperature (° C.) | 118 | 118 | 118 | 118 | 118 | 118 | 118 |
| Magnification (MD × TD) | 5 × 5 | 5 × 5 | 5 × 5 | 5 × 5 | 5 × 5 | 5 × 5 | 5 × 5 |
| Stretching Speed (MD × TD)[6] | 22 × 22 | 22 × 22 | 22 × 22 | 22 × 22 | 22 × 22 | 22 × 22 | 22 × 22 |
| Heat-Setting Treatment | | | | | | | |
| Temperature (° C.) | 125 | 125 | 125 | 118 | 118 | 118 | 125 |
| Time (minute) | 5 | 5 | 5 | 5 | 5 | 5 | 5 |
| Properties of Microporous Membrane | | | | | | | |
| Thickness (μm) | 19.1 | 47.2 | 34.5 | 29.0 | — | 69.2 | 29.1 |
| Air Permeability[7] | 1482 | 747 | 322 | 3711 | — | 13 | 245 |
| Porosity (%) | 30.8 | 47.0 | 58.7 | 26.0 | — | 77.2 | 48.9 |
| Prick Resistance (gf/20 μm) | 503 | 259 | 86 | 457 | — | 27 | 211 |
| (mN/20 μm) | 4929 | 2538 | 843 | 4479 | — | 265 | 2068 |
| Meltdown Temperature (° C.) | 175.9 | 183.9 | 170.7 | 166.0 | — | 168.6 | 163.2 |

Note:
[1]Mw represents a weight-average molecular weight.
[2]HMW Fraction represents a high-molecular-weight fraction having a molecular weight of $1.8 \times 10^6$ or more (% by mass).
[3]Mw/Mn represents a molecular weight distribution.
[4]Ns represents the number of revolutions of a screw.
[5]Q represents an extrusion rate.
[6]The unit is %/sec.
[7]The unit is sec/100 cm$^3$/20 μm.

As shown in Table 1, the microporous polyolefin membranes of Examples 1-10 had well-balanced air permeability, porosity, prick resistance, and meltdown properties. On the other hand, the microporous polyolefin membrane of Comparative Examples 1, 4 and 5 was poorer in meltdown properties than those of Examples 1-10, because a fraction having a molecular weight of $1.8 \times 10^6$ or more was less than 10% by mass of the polypropylene. Particularly the microporous polyolefin membranes of Comparative Examples 1 and 4 were poorer in meltdown properties and prick resistance than those of Examples 1-10. Also, the microporous polyolefin membrane of Comparative Example 2 was poorer in air permeability and meltdown properties than those of Examples 1-10, because the heat of fusion was less than 90 J/g.

EFFECT OF THE INVENTION

The microporous polyolefin membrane of the present invention has well-balanced permeability, mechanical properties and meltdown properties. The use of such microporous polyolefin membrane as separators provides batteries with excellent capacity properties, cyclability, discharge properties, heat resistance, compression resistance, productivity, etc.

What is claimed is:
1. A microporous polyolefin membrane comprising at least one polyethylene, and 20 to 80 wt. % of at least one polypropylene having a weight-average molecular weight of $6 \times 10^5$ or more and a heat of fusion of 90 J/g or more, a fraction of said polypropylene having a molecular weight of $1.8 \times 10^6$ or more being 10% or more by mass of the polypropylene.

2. A battery separator formed by a microporous polyolefin membrane comprising at least one polyethylene, and 20 to 80 wt. % of at least one polypropylene having a weight-average molecular weight of $6\times10^5$ or more and a heat of fusion of 90 J/g or more, a fraction of said polypropylene having a molecular weight of $1.8\times10^6$ or more being 10% or more by mass of the polypropylene.

3. The microporous polyolefin membrane of claim 1, wherein said a polypropylene has a weight-average molecular weight of about $8\times10^5$ or more.

4. The microporous polyolefin membrane of claim 1, wherein said fraction of said polypropylene having a molecular weight of $1.8\times10^6$ or more is at least 15% or more by mass.

5. The microporous polyolefin membrane of claim 1, wherein said polypropylene has a heat of fusion of 95 J/g or more.

6. The microporous polyolefin membrane of claim 1, wherein said polypropylene comprises 20 to 80% by mass of the combined masses of the polyethylene and polypropylene.

7. The microporous polyolefin membrane of claim 1, wherein said at least one polyethylene resin is ultra-high-molecular-weight polyethylene, a polyethylene other than the ultra-high-molecular-weight polyethylene, or a mixture of ultra-high-molecular-weight polyethylene and polyethylene other than the ultra-high-molecular-weight polyethylene.

8. The microporous polyolefin membrane of claim 7, wherein said ultra-high-molecular-weight polyethylene preferably has a weight-average molecular weight of about $5\times10^5$ or more.

9. The microporous polyolefin membrane of claim 8, wherein said ultra-high-molecular-weight polyethylene has a weight-average molecular weight of about $1\times10^6$ to about $15\times10^6$.

10. The microporous polyolefin membrane of claim 9, wherein said ultra-high-molecular-weight polyethylene has a weight-average molecular weight of about $1\times10^6$ to about $5\times10^6$.

11. The microporous polyolefin membrane of claim 7, wherein said ultra-high-molecular-weight polyethylene comprises an ethylene homopolymer, or an ethylene·α-olefin copolymer containing an amount of an α-olefin other than ethylene.

12. The microporous polyolefin membrane of claim 1, wherein said at least one polyethylene resin has a weight-average molecular weight of $2\times10^5$ or more, and Mw/Mn of 5-300.

13. The microporous polyolefin membrane of claim 7, wherein said polyethylene composition comprises (a) polyethylene having a weight-average molecular weight of $5\times10^5$ or more, and (b) at least one selected from the group consisting of polyethylene having a weight-average molecular weight of $1\times10^4$ or more and less than $5\times10^5$, polybutene-1 having a weight-average molecular weight of $1\times10^4$ to $4\times10^6$, a polyethylene wax having a weight-average molecular weight of $1\times10^3$ to $1\times10^4$, and an ethylene·α-olefin copolymer having a weight-average molecular weight of $1\times10^4$ to $4\times10^6$.

14. The microporous polyolefin membrane of claim 13, wherein said polyethylene composition comprises polyethylene having a weight-average molecular weight of $5\times10^5$ or more, and polyethylene having a weight-average molecular weight of $1\times10^4$ or more and less than $5\times10^5$.

15. The microporous polyolefin membrane of claim 14, wherein said polyethylene having a weight-average molecular weight of $1\times10^4$ or more and less than $5\times10^5$ is high-density polyethylene, medium-density polyethylene, branched low-density polyethylene, or linear low-density polyethylene.

16. The microporous polyolefin membrane of claim 15, wherein said polyethylene composition comprises polyethylene having a weight-average molecular weight of $5\times10^5$ or more, and high-density polyethylene having a weight-average molecular weight of $1\times10^4$ or more and less than $5\times10^5$.

17. The microporous polyolefin membrane of claim 1, wherein the microporous polyolefin membrane has a porosity of 25-80%, an air permeability of 20-2,000 seconds/100 cc, a prick resistance of 2,000 mN/20 μm or more, and a meltdown temperature of 170° C. or more.

18. The microporous polyolefin membrane of claim 1, wherein the microporous polyolefin membrane has a porosity of 25-80%, an air permeability of 20-2,000 seconds/100 cc, a prick resistance of 2,000 mN/20 μm or more, and a meltdown temperature of 170 to 190° C.

* * * * *